United States Patent
Ito et al.

(10) Patent No.: US 11,405,124 B2
(45) Date of Patent: Aug. 2, 2022

(54) WIRELESS COMMUNICATION SYSTEM, PARENT STATION APPARATUS AND WIRELESS COMMUNICATION METHOD

(71) Applicant: NIPPON TELEGRAPH AND TELEPHONE CORPORATION, Tokyo (JP)

(72) Inventors: Kota Ito, Musashino (JP); Nobuaki Otsuki, Musashino (JP); Mizuki Suga, Musashino (JP); Naoki Kita, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/311,665

(22) PCT Filed: Dec. 4, 2019

(86) PCT No.: PCT/JP2019/047479
§ 371 (c)(1),
(2) Date: Jun. 7, 2021

(87) PCT Pub. No.: WO2020/121919
PCT Pub. Date: Jun. 18, 2020

(65) Prior Publication Data
US 2022/0109518 A1 Apr. 7, 2022

(30) Foreign Application Priority Data
Dec. 10, 2018 (JP) .............................. JP2018-231144

(51) Int. Cl.
*H04J 14/02* (2006.01)
*H04B 10/548* (2013.01)
(Continued)

(52) U.S. Cl.
CPC .............. *H04J 14/02* (2013.01); *H04B 10/11* (2013.01); *H04B 10/2575* (2013.01); *H04B 10/548* (2013.01)

(58) Field of Classification Search
CPC ...... H04B 14/02; H04B 10/11; H04B 10/548; H04B 10/2575
(Continued)

(56) References Cited

U.S. PATENT DOCUMENTS

| | | | |
|---|---|---|---|
| 2002/0012495 A1* | 1/2002 | Sasai | H04B 10/25754 385/24 |
| 2003/0039010 A1* | 2/2003 | Akimoto | H04J 14/025 398/139 |

(Continued)

FOREIGN PATENT DOCUMENTS

| | | |
|---|---|---|
| JP | 4246724 B2 | 4/2009 |
| JP | 201496637 A | 5/2014 |

OTHER PUBLICATIONS

Dennis T. K. Tong and Ming C. Wu, A Novel Multiwavelength Optically Controlled Phased Array Antenna with a Programmable Dispersion Matrix, IEEE Photonics Technology Letters, vol. 8, No. 6, 1996, pp. 812-814.

*Primary Examiner* — Dalzid E Singh (57) ABSTRACT

A master station device is connected to a slave station device that emits a transmission signal received by light via an optical transmission path from a plurality of antenna elements. The master station device includes an optical signal output unit that outputs optical signals of a plurality of wavelengths, a phase adjustment unit that adjusts, for each wavelength, a phase of the transmission signal based on phase rotation that the optical signal is to undergo while being transmitted through the optical transmission path and a phase in one of the antenna elements corresponding to the wavelength of the optical signal, an optical modulation unit (Continued)

that modulates, for each wavelength, the optical signal output by the optical signal output unit with the transmission signal the phase of which is adjusted in accordance with the wavelength of the optical signal, and an optical combining unit that multiplexes the optical modulated signal of each wavelength and outputs the multiplexed signal to the optical transmission path. The slave station device includes an optical demultiplexing unit that demultiplexes the optical modulated signal transmitted through the optical transmission path and an optical/electric conversion unit that outputs the transmission signal obtained by converting the optical modulated signal of each wavelength into an electric signal to one of the plurality of the antenna elements corresponding to the wavelength.

5 Claims, 5 Drawing Sheets (51) Int. Cl.
*H04B 10/11* (2013.01)
*H04B 10/2575* (2013.01)

(58) Field of Classification Search
USPC .......................................... 398/96
See application file for complete search history.

(56) References Cited

U.S. PATENT DOCUMENTS

| 2017/0033885 | A1* | 2/2017 | Cavaliere | H04B 10/2575 |
| 2017/0307648 | A1* | 10/2017 | Kotake | G01S 17/58 |
| 2019/0273518 | A1* | 9/2019 | Wang | H04B 1/38 |

* cited by examiner

WIRELESS COMMUNICATION SYSTEM, PARENT STATION APPARATUS AND WIRELESS COMMUNICATION METHOD

CROSS-REFERENCE TO RELATED APPLICATIONS

This application is a 371 U.S. National Phase of International Application No. PCT/JP2019/047479 filed on Dec. 4, 2019, which claims priority to Japanese Application No. 2018-231144 filed on Dec. 10, 2018. The entire disclosures of the above applications are incorporated herein by reference.

TECHNICAL FIELD

The present invention relates to a wireless communication system, a master station device, and a wireless communication method.

BACKGROUND ART

A millimeter wave band has been attracting attention as a frequency band that allows high speed transmission in a wireless communication service. However, the millimeter wave band has a large propagation loss, and thus there is a problem that long-range transmission is difficult.

As one solution to this problem, a radio over fiber (RoF) system is known. In the RoF system, an accommodation station (master station) modulates intensity of an optical carrier with a radio frequency (RF) signal to be transmitted, and transmits the modulated signal through an optical fiber. A base station (slave station) converts the optical signal received via the optical fiber back into the RF signal, and emits the RF signal from an antenna as a radio wave. Utilizing such an RoF system allows long-range transmission of a millimeter wave band RF signal.

However, even if the RoF system is applied to the millimeter wave band, expanding a cover area of a base station becomes a next challenge. One of the solutions is beam forming with an array antenna. In beam forming with an array antenna, the phase of an RF signal incident on each antenna element of the array antenna is controlled, and radio waves emitted from the antenna elements are caused to interfere with each other. In this manner, the radiation direction of the radio waves is controlled as a whole.

As beam forming in the RoF system, there is known a technique of controlling the phase of an RF signal incident on each antenna element by controlling a wavelength of an optical carrier using the fact that a delay difference is generated between optical signals of respective wavelengths due to wavelength dispersion during optical fiber transmission (see, for example, PTL1).

Figure 3:
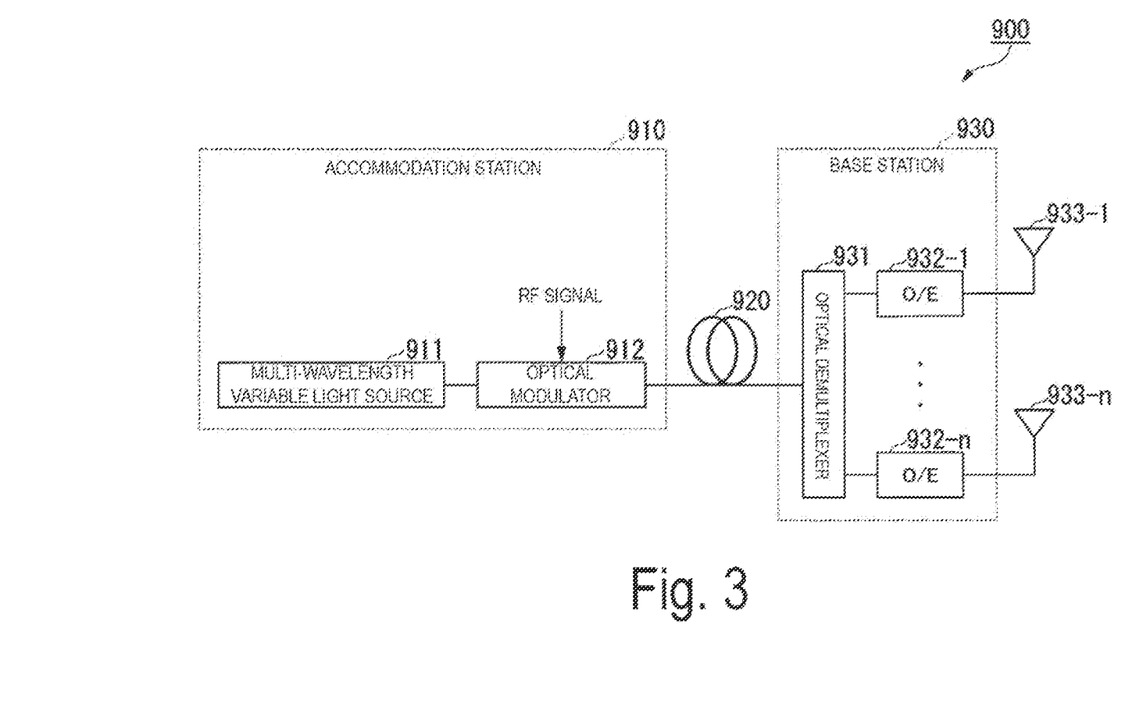
FIG. 3 is a block diagram illustrating a configuration of an RoF system to which a related art is applied.

FIG. 3 is a block diagram of an RoF system 900 to which the technique of PTL1 is applied. A multi-wavelength variable light source 911 of an accommodation station 910 outputs a plurality of optical signals. A wavelength interval between these optical signals can optionally be changed. An optical modulator 912 modulates an optical signal of each wavelength with a RF signal to be transmitted. In this way, the optical modulator 912 outputs the plurality of optical modulated signals. Each of the optical modulated signals is transmitted in an optical fiber 920. At this time, the optical modulated signals of different wavelengths have different delay differences due to the influence of wavelength dispersion. An optical demultiplexer 931 of a base station 930 splits, for each wavelength, the plurality of optical modulated signals transmitted in the optical fiber 920. A plurality of optical/electric (O/E) converters 932-1, ..., 932-$n$ each convert the optical modulated signal of a corresponding wavelength obtained by the splitting into an electric signal. Antenna elements 933-1, ..., 933-$n$ each emit the electric signal after the conversion as an RF signal. At this time, due to a delay difference caused by the wavelength dispersion during the transmission in the optical fiber 920, each RF signal has a phase difference, thereby forming directivity.

Further, a method of performing beam forming of an array antenna using an optical signal is not limited to the RoF system, but also used in other systems. In one example of the method, there is known a technique of assigning a fixed wavelength to each antenna element without controlling a wavelength, and causing an optical signal of each wavelength to have a delay difference by using wavelength dispersion or path difference (for example, see Non Patent Literature 1).

Figure 4:
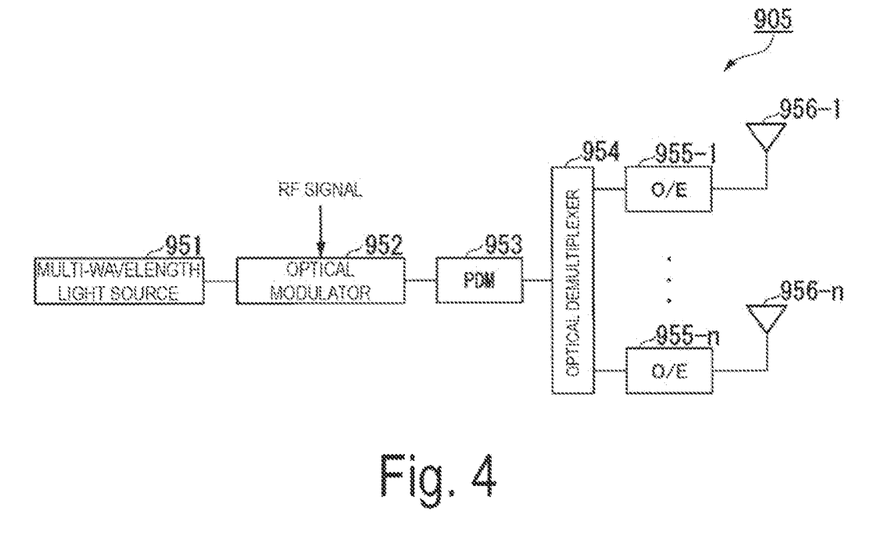
FIG. 4 is a block diagram illustrating a configuration of a wireless system to which a related art is applied.

FIG. 4 is a diagram of a wireless system 905 to which the technology of Non Patent Literature 1 is applied. A multi-wavelength light source 951 outputs optical signals of a plurality of different wavelengths. An optical modulator 952 modulates an optical signal of each wavelength with an RF signal to be transmitted. In this way, the optical modulator 952 outputs the plurality of optical modulated signals. Each optical modulated signal is sent to a programmable dispersion matrix (PDM) 953.

Figure 5:
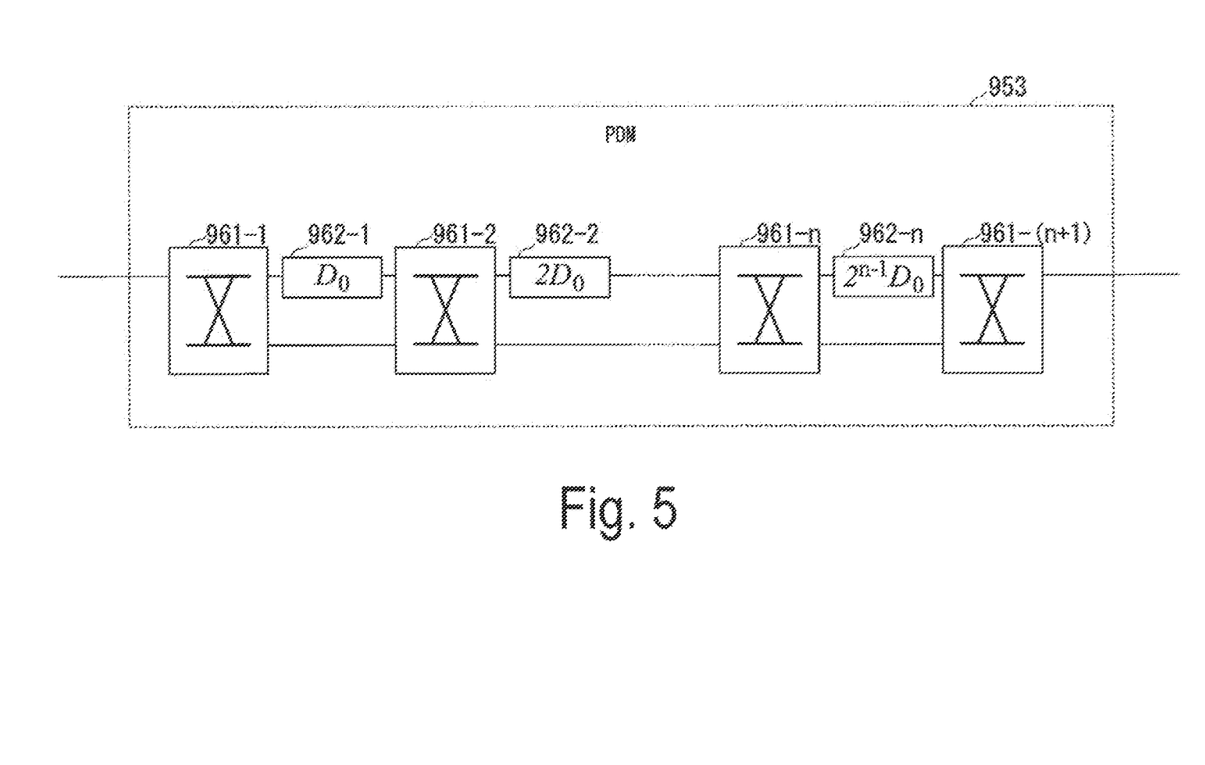
FIG. 5 is a block diagram illustrating a configuration of a PDM in FIG. 4.

FIG. 5 is a block diagram illustrating a configuration of the PDM 953. The PDM 953 includes n+1 two-by-two light switches 961-1, ..., 961-(n+1) and n dispersive elements 962-1, 962-2, ..., 962-$n$ with variance values of $D_0$, $2D_0$, $2^{n-1}D_0$. The dispersive elements 962-1, ..., 962-$n$ each include a dispersion fiber, a grating fiber, and the like. The PDM 953 adjusts a variance value as a whole by switching the two-by-two optical switches 961-1, ..., 961-(n+1). Each optical modulated signal input to the PDM 953 has a different delay difference according to a variance value adjusted by the PDM 953.

An optical demultiplexer 954 of the wireless system 905 illustrated in FIG. 4 splits, for each wavelength, a plurality of optical modulated signals output from the PDM 953. The wavelengths correspond to the individual antenna elements 956-1, ..., 956-$n$ in advance, and thus the light is split in a fixed manner. A plurality of optical/electric (O/E) converters 955-1, ..., 955-$n$ each convert the optical modulated signal of a corresponding wavelength obtained by the splitting into an electric signal. The antenna elements 956-1, ..., 956-$n$ each emit the electric signal obtained by the conversion as an RF signal. At this time, due to a delay difference caused by dispersion of the PDM 953, each RF signal has a phase difference, thereby forming directivity.

Summarizing the above, PTL1 is a method of causing each modulated optical signal to have a delay difference with a wavelength made variable and dispersion fixed, and Non Patent Literature 1 is a method of causing each modulated optical signal to have a delay difference with a wavelength fixed and dispersion made variable.

CITATION LIST

Patent Literature

PTL1: JP 4246724 B

Non Patent Literature

Non Patent Literature 1: Dennis T. K. Tong, N.C. Wu, "A Novel Multiwavelength Optically Controlled Phased Array Antenna with a Programmable Dispersion Matrix", IEEE Photonics Technology Letters, June 1996, VOL. 8, NO. 6, p. 812-814

SUMMARY OF THE INVENTION

Technical Problem

As described above, the technique of PTL1 causes each modulated optical signal to have a delay difference with a wavelength made variable and dispersion fixed. At this time, it is necessary to adjust a wavelength interval between optical modulated signals to be large depending on a direction in which directivity is formed, a fiber length, and a frequency of an RF signal. This widens a wavelength band that is used, which can lower wavelength utilization efficiency. In particular, in wavelength division multiplex (WDM)-passive optical network (PON), a different wavelength must be used in each base station. If the technique of PTL1 is applied in such a situation, a wavelength band for beam forming must be further set in advance in a WDM-PON, and a wavelength band to be used will be significantly expanded.

Further, in the technique of PTL1, the wavelength is adjusted for directivity formation. Accordingly, the wavelength transmitted to each antenna element of the base station also needs to be adjusted. For this reason, the optical demultiplexer of the base station needs to change the wavelength to be sent to each antenna element of the base station every time the directivity is formed. When the directivity is changed dynamically, splitting of the optical demultiplexer also needs to be changed dynamically. This means that control of the optical demultiplexer of the base station is necessary.

One advantage of applying the RoF system is that the base station can be simplified by aggregating functions into the accommodation station in addition to long-range transmission of the RF signal. However, the technique of PTL1 requires control of the optical demultiplexer of the base station, and there is a limit to simplification of the base station.

On the other hand, the technique of Non Patent Literature 1 causes each modulated optical signal to have a delay difference with a wavelength fixed and dispersion made variable. At this time, the wavelength is fixed, and thus the wavelength utilization efficiency is better than that of PTL1. Further, light is split in a fixed manner, and thus it is not necessary to control the optical demultiplexer. However, it is conceivable that a PDM for adjusting dispersion need to be designed and manufactured with high accuracy. Therefore, the device may become large in size and high in cost.

Further, Non Patent Literature 1 does not mention application to RoF. For this reason, in a case where RoF is applied to Non Patent Literature 1 for long-range optical fiber transmission, the influence of wavelength dispersion during optical fiber transmission must also be considered in addition to dispersion adjustment by the PDM.

In view of the above circumstances, an object of the present invention is to provide a wireless communication system, a master station device, and a wireless communication method that enables an RoF system that does not require base station control while suppressing deterioration of wavelength utilization efficiency and cost increase.

Means for Solving the Problem

An embodiment of the present invention is a wireless communication system including a master station device, and a slave station device configured to emit, from a plurality of antenna elements, transmission signals received using light from the master station device via an optical transmission path. The master station device includes: an optical signal output unit configured to output optical signals of a plurality of different wavelengths; a phase adjustment unit configured to adjust, for each wavelength, a phase of a corresponding one of the transmission signals based on phase rotation that the optical signal of the wavelength is to undergo while being transmitted through the optical transmission path and a phase in one of the antenna elements corresponding to the wavelength; an optical modulation unit configured to modulate, for each wavelength, the optical signal of the wavelength output by the optical signal output unit with the transmission signal the phase of which is adjusted by the phase adjustment unit in accordance with the wavelength, thereby generating an optical modulated signal; and an optical combining unit configured to multiplex the optical modulated signal of each wavelength generated by the optical modulation unit and output the multiplexed signal to the optical transmission path. The slave station device includes: an optical demultiplexing unit configured to demultiplex, for each wavelength, the optical modulated signal transmitted through the optical transmission path; and an optical/electric conversion unit configured to output the transmission signal obtained by converting the optical modulated signal of each wavelength demultiplexed by the optical demultiplexing unit into an electric signal to one of the plurality of antenna elements corresponding to the wavelength.

An embodiment of the present invention is the wireless communication system described above, in which the optical signal output unit includes a multi-wavelength light source and an optical demultiplexer configured to split, for each wavelength, the optical signal output by the multi-wavelength light source or includes a plurality of light sources configured to output optical signals of the wavelengths different from each other.

An embodiment of the present invention is the wireless communication system described above, in which the phase rotation that the optical signal of each wavelength is to undergo while being transmitted through the optical transmission path is obtained from a difference between an amount of phase rotation that an optical signal of any of the plurality of wavelengths is to undergo while being transmitted through the optical transmission path and an amount of the phase rotation that an optical signal of each of the plurality of wavelengths different from each other is to undergo while being transmitted through the optical transmission path.

An embodiment of the present invention is a master station device connected to a slave station device configured to emit, from a plurality of antenna elements, transmission signals received using light via an optical transmission path. The master station device includes an optical signal output unit configured to output optical signals of a plurality of different wavelengths, a phase adjustment unit configured to adjust, for each wavelength, a phase of a corresponding one of the transmission signals based on phase rotation that the optical signal of the wavelength is to undergo while being transmitted through the optical transmission path and a phase in one of the antenna elements corresponding to the wavelength, an optical modulation unit configured to modulate, for each wavelength, the optical signal of the wavelength output by the optical signal output unit with the transmission signal the phase of which is adjusted by the phase adjustment unit in accordance with the wavelength, thereby generating an optical modulated signal, and an optical combining unit configured to multiplex the optical modulated signal of each wavelength generated by the optical modulation unit and output the multiplexed signal to the optical transmission path.

An embodiment of the present invention is a wireless communication method executed by a wireless communication system including a master station device; and a slave station device configured to emit, from a plurality of antenna elements, transmission signals received using light from the master station device via an optical transmission path. The wireless communication method includes: by the master station device, outputting optical signals of a plurality of different wavelengths; by the master station device, adjusting, for each wavelength, a phase of a corresponding one of the transmission signals based on phase rotation that the optical signal of the wavelength is to undergo while being transmitted through the optical transmission path and a phase in one of the plurality of antenna elements corresponding to the wavelength; by the master station device, modulating, for each wavelength, the optical signal of the wavelength output in the outputting with the transmission signal the phase of which is adjusted in the adjusting in accordance with the wavelength, thereby generating an optical modulated signal; by the master station device, multiplexing the optical modulated signal of each wavelength generated in the modulating and outputting the multiplexed signal to the optical transmission path; by the slave station, demultiplexing, for each wavelength the optical modulated signal transmitted through the optical transmission path; and by the slave station, outputting the transmission signal obtained by converting the optical modulated signal of each wavelength demultiplexed in the demultiplexing into an electric signal to one of the plurality of antenna elements corresponding to the wavelength.

Effects of the Invention

The present invention enables an RoF system that does not require base station control while suppressing deterioration of wavelength utilization efficiency and cost increase.

DESCRIPTION OF EMBODIMENTS

Hereinafter, embodiments of the present invention will be described in detail with reference to the drawings. A wireless communication system of each of the present embodiments is used as an RoF system that performs beam forming. In the wireless communication system of each of the present embodiments, an accommodation station (master station) device optically modulates optical signals of a plurality of wavelengths to be transmitted through an optical fiber toward a base station (slave station) device with an RF signal for which phase rotation to be generated by wavelength dispersion during optical fiber transmission is compensated in advance. This enables a beam forming type RoF system that does not require base station control while suppressing deterioration of wavelength utilization efficiency and cost increase. Detailed embodiments will be described below.

First Embodiment

Figure 1:
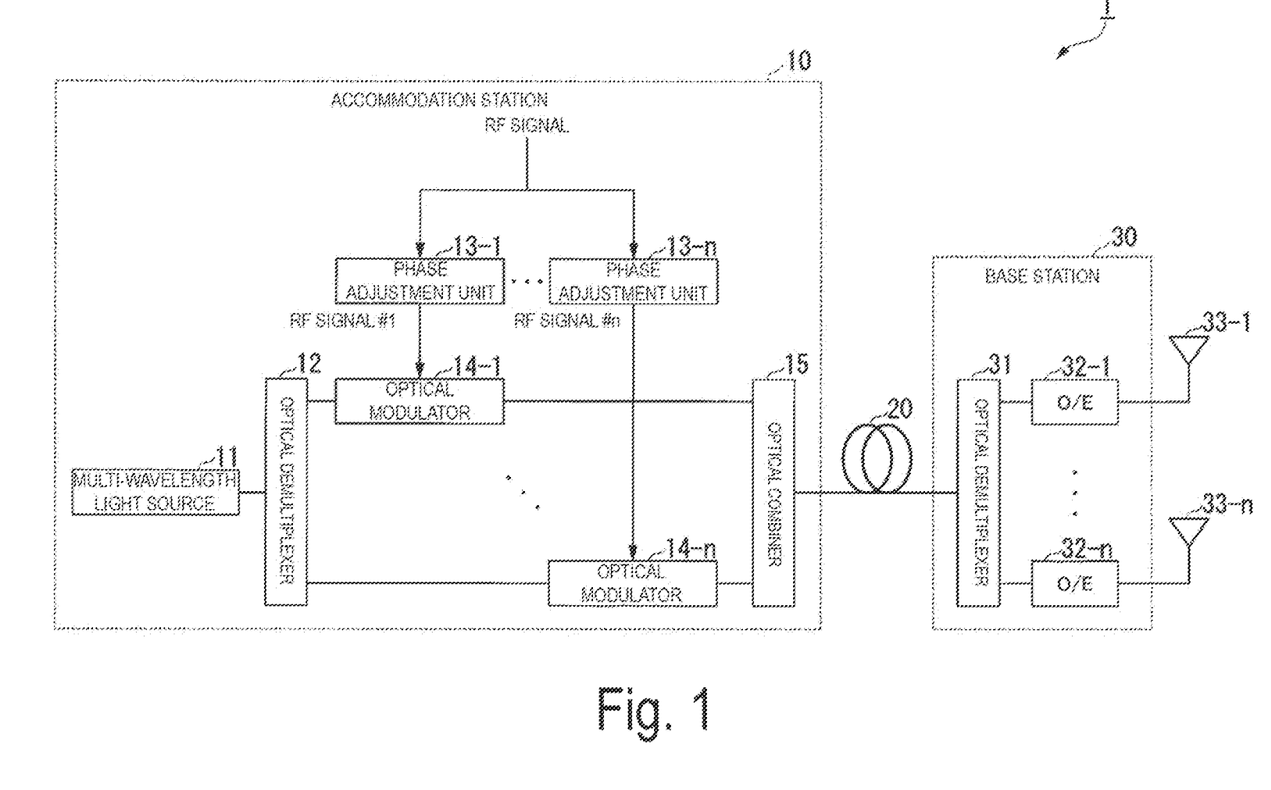
FIG. 1 is a block diagram illustrating a configuration of an optically controlled beam forming system according to a first embodiment of the present invention.

FIG. 1 is a block diagram illustrating a configuration of an optically controlled beam forming system 1 according to a first embodiment. The optically controlled beam forming system 1 is an example of a wireless communication system. The optically controlled beam forming system 1 illustrated in the diagram has an accommodation station 10 and a base station 30. The accommodation station 10 is a master station device, and the base station 30 is a slave station device. The accommodation station 10 and the base station 30 are connected by an optical fiber 20.

The accommodation station 10 includes a multi-wavelength light source 11, an optical demultiplexer 12, phase adjustment units 13-1, . . . , 13-n (n is an integer of two or more, the same applies hereinafter), optical modulation units 14-1, . . . , 14-n, and an optical combiner 15. The base station 30 includes an optical demultiplexer 31, optical/electric (O/E) converters 32-1, . . . , 32-n, and antenna elements 33-1, . . . , 33-n.

The multi-wavelength light source 11 generates optical signals of wavelengths λ1, . . . , λn. The optical demultiplexer 12 fixedly splits the optical signals of the wavelengths λ1, . . . , λn. A phase adjusting unit 13-i (i is an integer of one or more and n or less, and the same applies hereinafter) performs phase adjustment on an RF signal based on a phase in an antenna element 33-i of the base station 30 and phase rotation that an optical modulated signal of a wavelength Xi is to undergo due to an influence of wavelength dispersion during transmission through the optical fiber 20. The phase adjustment unit 13-i outputs an RF signal #i generated by the phase adjustment. An optical modulation unit 14-i modulates the optical signal of the wavelength Xi with the RF signal #i to generate an optical modulated signal. The optical combiner 15 receives the optical modulated signal of the wavelength λi from the optical modulation unit 14-i. The optical combiner 15 combines received optical modulated signals of the wavelengths λ1, . . . , λn and outputs the combined optical modulated signals to the optical fiber 20. The optical fiber 20 transmits the optical modulated signals.

The optical demultiplexer 31 of the base station 30 fixedly splits the optical modulated signals transmitted by the optical fiber 20. The optical demultiplexer 31 outputs the optical modulated signal of the wavelength λi obtained by the splitting to an O/E converter 32-i. The O/E converter 32-i converts the optical modulated signal of the wavelength λi into an electric signal and outputs the electric signal to an antenna element 33-i. The antenna element 33-i emits the electric signal output by the O/E converter 32-i as an RF signal. At this time, the phase adjustment by the phase adjustment unit 13-i causes the RF signal to have a phase difference, thereby forming directivity.

Details of an operation of the optically controlled beam forming system 1 will be described.

The multi-wavelength light source 11 of the accommodation station 10 generates optical signals of n wavelengths λ1, . . . , λn different from each other. Considering the wavelength λi which is any one of the n wavelengths λ1, . . . , λn, the wavelength λi corresponds to the optical modulation unit 14-*i* and the antenna element 33-*i*. The optical demultiplexer 12 fixedly splits the optical signals of the wavelengths λ1, . . . , λn generated by the multi-wavelength light source 11 and outputs optical signals to the optical modulation units 14-1, . . . , 14-*n* corresponding to the respective wavelengths. The light is split in a fixed manner, and thus control of the optical demultiplexer 12 is not required.

The phase adjusting unit 13-*i* performs phase adjustment on an input RF signal based on a phase in the antenna element 33-*i* of the base station 30 and phase rotation that the optical modulated signal of the wavelength λi is to undergo due to an influence of wavelength dispersion during optical fiber transmission. The phase adjustment unit 13-*i* outputs a phase-adjusted RF signal #i.

When the optical modulated signal of the wavelength λi is transmitted through the optical fiber 20, the optical modulated signal of the wavelength λi is phase-rotated under the influence of wavelength dispersion. An amount of phase rotation that the optical modulated signal of the wavelength λi is to undergo as an RF signal during transmission through the optical fiber 20 is defined as φi. That is, a phase difference between the RF signal #i input to the optical modulation unit 14-*i* and the RF signal that the base station 30 converts the optical modulated signal of the wavelength λi and emits is defined as φi.

Further, the phase of the RF signal emitted by the antenna element 33-*i* is defined as Oi. At this time, the phase adjustment unit 13-*i* outputs the RF signal #i obtained by adjusting a phase of the input RF signal to θi−φi. The optical modulation unit 14-*i* modulates the optical signal of the wavelength λi with the RF signal #i to output an optical modulated signal.

In general, a signal obtained by modulating an optical signal with an RF signal is a double side band (DSB) signal.

The DSB signal is influenced by wavelength dispersion when transmitted through an optical fiber, a delay difference is generated between a lower side band and an upper side band, and fading occurs. This limits the optical fiber length where transmission is possible. The higher the frequency of the RF signal, the wider the interval between the side bands, so that the fading effect becomes significant. To avoid the fading due to wavelength dispersion, the optical modulation unit 14-*i* may have a function of taking measures against fading due to wavelength dispersion, such as converting an optical modulated signal into a single side band (SSB) signal or a two-tone signal.

The optical combiner 15 combines optical modulated signals of the wavelengths λ1, . . . , λn output by the optical modulation units 14-1, . . . , 14-*n* and transmits the combined signals to the one optical fiber 20. When transmitted through the optical fiber, the optical signals are influenced by wavelength dispersion, and a delay difference which is different for each wavelength is generated in the optical signal. As described above, when the optical modulated signal of the wavelength λi is transmitted through the optical fiber 20, the signal is phase-rotated by φi as an RF signal under the influence of wavelength dispersion.

The optical demultiplexer 31 of the base station 30 fixedly splits the optical modulated signal of the wavelength λ1, . . . , λn transmitted through the optical fiber 20, and outputs respective signals to the antenna elements 33-1, . . . , 33-*n*.

The light is split in a fixed manner, and thus control of the optical demultiplexer 31 is not required. That is, it is not necessary to control the base station 30.

The O/E converter 32-*i* converts the optical modulated signal of the wavelength λi obtained by the splitting into an RF signal. The optical modulated signal of the wavelength λi is modulated with the RF signal #i the phase of which has been adjusted to θi×φi and further phase-rotated by φi as an RF signal when transmitted through the optical fiber 20. For this reason, the phase of the RF signal obtained by the O/E conversion of the optical modulated signal of the wavelength λi is θi−φi+φi=θi. Thus, the RF signal of the phase Oi is emitted from the antenna element 33-*i*. At this time, the RF signal emitted from each of the antenna elements 33-1, . . . , 33-*n* has a phase difference, thereby forming directivity.

That is, in a case where the phase of the RF signal emitted by the antenna element 33-*i* is desired to be θi, it is only required that the phase adjustment unit 13-*i* adjust the phase of the input RF signal to θi−φi.

Modified Example of First Embodiment

In a case where the intervals between the n different wavelengths λ1, . . . , λn generated by the multi-wavelength light source 11 of the first embodiment are sufficiently small, the variance value of the optical fiber 20 with respect to each of the wavelengths λ1, . . . , λn can be considered to be equal. At this time, when the intervals between the wavelengths λ1, . . . , λn are equalized, the intervals of the phase rotations that the optical modulated signals of the wavelengths λ1, . . . , λn are to undergo due to the wavelength dispersion when transmitted through the optical fiber 20 also become equal. Therefore, the phase adjustment in the phase adjustment units 13-1, . . . , 13-*n* can be simplified.

In a case where the wavelength intervals of the wavelengths λ1, . . . , λn of the optical signals generated by the multi-wavelength light source 11 are equal, λi=λ1+(i−1) Δλ can be established. When the optical modulated signals of the wavelength λ1, . . . , λn are transmitted through the optical fiber, the signals are phase-rotated by φi as RF signals under the influence of wavelength dispersion. Here, the wavelength intervals of the wavelengths λ1, . . . , λn are equal, and the variance values are also equal, so that the phase rotation amounts are also at equal intervals. That is, φi=φ1+(i−1)Δφ is established. It is only required that the phase adjustment unit 13-*i* adjust the phase of the input RF signal to θi−φi=θi−{φ1+(i−1)Δφ}.

For each of the optical modulated signals of the wavelengths λ1, . . . , λn, the phase adjustment unit 13-*i* can obtain a phase adjustment amount by calculating only φ1 and Δφ and then performing their algebraic calculation by the calculation described above instead of calculating each of the phase rotation amounts φ1, . . . , φn as an RF signal. Note that Δφ is a difference in the amounts of phase rotation that respective optical modulated signals of adjacent wavelengths are to undergo as RF signals when transmitted through the optical fiber 20. For example, Δφ can be obtained by dividing the difference between a phase rotation amount φj of a wavelength λj (j is an integer not less than one and not greater than n−1) and a phase rotation amount φk of a wavelength λk(j<k; k is an integer not less than two and not greater than n) by (k−j). Further, this is not limited to φ1, and a phase rotation amount φm (m is an integer not less than one or not greater than n) of any wavelength λm may be used to calculate φi=φm+(i−m)Δφ.

Second Embodiment

The accommodation station (master station) according to the first embodiment includes the single multi-wavelength light source capable of generating optical signals of different wavelengths. In the accommodation station of the present embodiment, a plurality of light sources generate optical signals of different wavelengths. Hereinafter, differences from the first embodiment will be mainly described.

Figure 2:
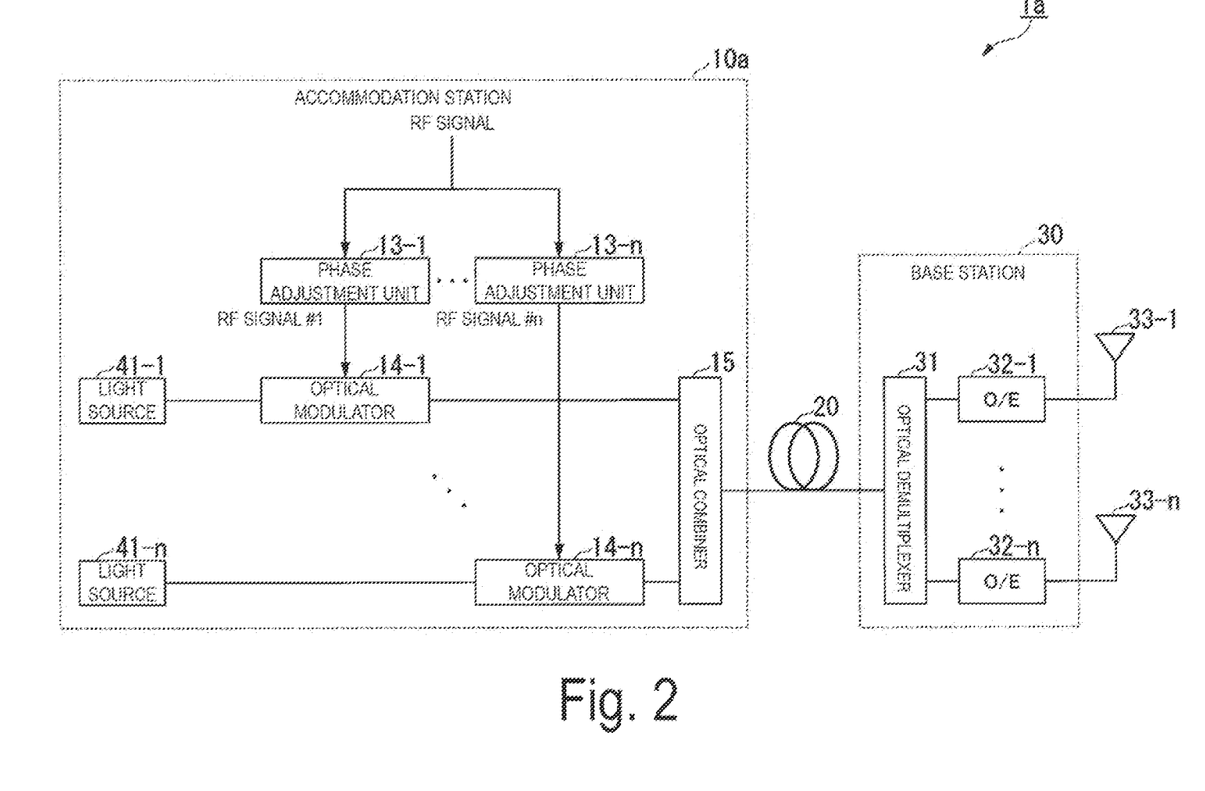
FIG. 2 is a block diagram illustrating a configuration of an optically controlled beam forming system according to a second embodiment.

FIG. 2 is a block diagram illustrating a configuration of an optically controlled beam forming system 1a according to the second embodiment. In the diagram, the same components as those of the optically controlled beam forming system 1 according to the first embodiment illustrated in FIG. 1 are denoted by the same reference signs. The optically controlled beam forming system 1a illustrated in the diagram is different from the optically controlled beam forming system 1 illustrated in FIG. 1 in that an accommodation station 10a is included in place of the accommodation station 10. The accommodation station 10a is different from the accommodation station 10 illustrated in FIG. 1 in that the accommodation station 10a includes light sources 41-1, ..., 41-n in place of the multi-wavelength light source 11 and the optical demultiplexer 12.

The light sources 41-1, ..., 41-n generate optical signals of different wavelengths. The light source 41-i generates an optical signal of a wavelength λi. The optical modulation unit 14-i receives the optical signal of the wavelength λi from the light source 41-i, and modulates the signal with an RF signal #i obtained by causing the phase adjustment unit 13-i to phase-adjust an RF signal.

Details of an operation of the optically controlled beam forming system 1a will be described.

The light sources 41-1, ..., 41-n of the accommodation station 10a generate optical signals of n different wavelengths λ1, ..., λn respectively. That is, the light source 41-i generates an optical signal of the wavelength λi.

Considering the wavelength λi which is any one of the n wavelengths λ1, ..., λn, the wavelength λi corresponds to the optical modulation unit 14-i and the antenna element 33-i. The optical modulation units 14-1, ..., 4-n receive the optical signals of the wavelengths λ1, ..., λn, respectively. The subsequent processing is similar to that of the optically controlled beam forming system 1 according to the first embodiment.

That is, the phase adjustment unit 13-i adjusts the phase of the input RF signal to θi−φi and outputs the signal. This amount of phase adjustment is based on the phase θi of the RF signal emitted by the antenna element 33-i of the base station 30 and the phase rotation amount φi that the optical modulated signal of the wavelength λi is to undergo as an RF signal due to an influence of wavelength dispersion during transmission through the optical fiber 20. The optical modulation unit 14-i modulates the optical signal of the wavelength λi with the RF signal #i to output an optical modulated signal. To avoid fading due to wavelength dispersion, the optical modulation unit 14-i may have a function of taking measures against fading due to wavelength dispersion, such as converting an optical modulated signal to an SSB signal or a two-tone signal as in the first embodiment. The optical combiner 15 combines optical modulated signals of the wavelengths λ1, ..., λn output by the optical modulation units 14-1, ..., 14-n, and transmits the combined signals to the one optical fiber 20. When the optical modulated signal of the wavelength λi is transmitted through the optical fiber, the signal is phase-rotated by φi as an RF signal under the influence of wavelength dispersion.

The optical demultiplexer 31 of the base station 30 fixedly splits the optical modulated signals of the wavelengths λ1, ..., λn transmitted through the optical fiber 20, and outputs the signals obtained by the splitting to the respective antenna elements 33-1, ..., 33-n.

The light is split in a fixed manner, and thus control of the optical demultiplexer 31 is not required. That is, it is not necessary to control the base station 30. The O/E converter 32-i converts the optical modulated signal of the wavelength λi into an RF signal by O/E conversion. The optical modulated signal of the wavelength λi is modulated with the RF signal #i the phase of which has been adjusted to θi−φi and further phase-rotated by φi as an RF signal when transmitted through the optical fiber 20. For this reason, the phase of the RF signal obtained by the O/E conversion is θi. The RF signal of the phase Oi is emitted from the antenna element 33-i. At this time, the RF signal emitted from each of the antenna elements 33-1, ..., 33-n has a phase difference, thereby forming directivity.

Modified Example of Second Embodiment

In a case where the intervals between the n different wavelengths λ1, ..., λn generated by the light sources 41-1, ..., 41-n of the second embodiment are sufficiently small, the variance value of the optical fiber 20 with respect to each of the wavelengths λ1, ..., λn can be considered to be equal. That is, λi=λ1+(i−1)Δλ, can be established. At this time, the intervals of the phase rotations that the optical modulated signals of the wavelengths λ1, ..., λn are to undergo due to the wavelength dispersion when transmitted through the optical fiber 20 also become equal. Thus, the phase adjustment in the phase adjustment units 13-1, ..., 13-n can be simplified as in the first embodiment.

In other words, when the optical modulated signal of the wavelength λi is transmitted through the optical fiber 20, the signal is phase-rotated by (pi as an RF signal under the influence of wavelength dispersion. The wavelength intervals of the wavelengths λ1, ..., λn are equal, and the variance values are also equal, so that the phase rotation amounts are also at equal intervals between the wavelengths. That is, φi=φ1+(i−1)Δφ is established. Therefore, for each the optical modulated signals of the wavelengths λ1, ..., λn, the phase adjustment units 13-1, ..., 13-n can obtain phase adjustment amounts by calculating only φ1 and Δφ and then performing their algebraic calculation instead of calculating the respective phase rotation amounts φ1, ..., φn as RF signals.

According to the embodiments described above, the accommodation station (master station) device of the RoF system optically modulates each of a plurality of optical signals to be transmitted through an optical fiber toward the base station (slave station) device with an RF signal for which phase rotation to be generated by wavelength dispersion during optical fiber transmission is compensated in advance. Thus, the accommodation station (master station) device of the RoF system causes each optical modulated signal to have a delay difference in optical fiber transmission with wavelength and dispersion fixed, thereby enabling beam forming in the RoF system while eliminating the need for base station control and suppressing deterioration of the wavelength utilization efficiency and cost increase.

According to the embodiments described above, a wireless communication system (for example, the optically controlled beam forming systems 1 and 1a) includes a master station device (for example, the accommodation stations 10 and 10a) and a slave station device (for example, the base station 30) that emits, from a plurality of antenna elements (for example, the antenna elements 33-1 to 33-n), a transmission signal received by light from the master station device via an optical transmission path (for example, the optical fiber 20).

The master station device includes an optical signal output unit, a phase adjustment unit, an optical modulation unit, and an optical combining unit. The optical signal output unit outputs optical signals of a plurality of different wavelengths. The phase adjustment unit (for example, the phase adjustment units 13-1 to 13-$n$) adjusts, for each of the wavelengths, the phase of a transmission signal based on phase rotation that an optical signal of one wavelength is to undergo while being transmitted through an optical transmission path and a phase in one of the antenna elements corresponding to the wavelength. The optical modulation unit (optical modulation units 14-1 to 14-$n$) modulates, for each of the wavelengths, an optical signal of one wavelength output by the optical signal output unit with a transmission signal the phase of which is adjusted by the phase adjustment unit in accordance with the wavelength to generate an optical modulated signal. The optical combining unit (for example, the optical combiner 15) multiplexes the optical modulated signals of respective wavelengths generated by the optical modulation units and outputs the multiplexed signals to the optical transmission path.

The slave station device includes an optical demultiplexing unit (for example, the optical demultiplexer 31) and optical/electric conversion units (for example, the O/E converters 32-1 to 32-$n$). The optical demultiplexing unit demultiplexes, for each wavelength, the optical modulated signals transmitted through the optical transmission path. The optical/electric conversion unit converts the optical modulated signals of respective wavelengths that are demultiplexed by the optical demultiplexing unit into electric signals, and outputs the electric signals to a plurality of antenna elements (for example, the antenna elements 33-1 to 33-$n$) corresponding to the respective wavelengths.

Note that the optical signal output unit may include a multi-wavelength light source (for example, the multi-wavelength light source 11) and an optical demultiplexer (for example, the optical demultiplexer 12) that separates, for each wavelength, the optical signal output from the multi-wavelength light source.

Further, the optical signal output unit may include a plurality of light sources (for example, the light sources 41-1 to 41-$n$) that output optical signals of wavelengths different from each other.

Further, the phase rotation that an optical signal of each of a plurality of wavelengths is to undergo while being transmitted through the optical transmission path may be obtained from a difference between an amount of the phase rotation that an optical signal of any wavelength is to undergo while being transmitted through the optical transmission path and an amount of the phase rotation that an optical signal of each of different wavelengths is to undergo while being transmitted through the optical transmission path.

The embodiments of the present invention have been described above in detail with reference to the drawings. However, specific configurations are not limited to those embodiments, and include any design or the like within the scope not departing from the gist of the present invention.

REFERENCE SIGNS LIST 1, 1a Optically controlled beam forming system
10, 10a Accommodation station
11 Multi-wavelength light source
12 Optical demultiplexer
13-1 to 13-$n$ Phase adjustment unit
14-1 to 14-$n$ Optical modulation unit
15 Optical combiner
20 Optical fiber
30 Base station
31 Optical demultiplexer
32-1 to 32-$n$ O/E converter
33-1 to 33-$n$ Antenna element
41-1 to 41-$n$ Light source

The invention claimed is:

1. A wireless communication system comprising:
a master station device; and
a slave station device configured to emit, from a plurality of antenna elements, transmission signals received using light from the master station device via an optical transmission path, wherein
the master station device includes:
an optical signal output unit configured to output optical signals of a plurality of different wavelengths;
a phase adjustment unit configured to adjust, for each wavelength, a phase of a corresponding one of the transmission signals based on phase rotation that the optical signal of the wavelength is to undergo while being transmitted through the optical transmission path and a phase in one of the antenna elements corresponding to the wavelength;
an optical modulation unit configured to modulate, for each wavelength, the optical signal of the wavelength output by the optical signal output unit with the transmission signal the phase of which is adjusted by the phase adjustment unit in accordance with the wavelength, thereby generating an optical modulated signal; and
an optical combining unit configured to multiplex the optical modulated signal of each wavelength generated by the optical modulation unit and output the multiplexed signal to the optical transmission path, and
the slave station device includes:
an optical demultiplexing unit configured to demultiplex, for each wavelength, the optical modulated signal transmitted through the optical transmission path; and
an optical/electric conversion unit configured to output the transmission signal obtained by converting the optical modulated signal of each wavelength demultiplexed by the optical demultiplexing unit into an electric signal to one of the plurality of antenna elements corresponding to the wavelength.

2. The wireless communication system according to claim 1, wherein
the optical signal output unit includes a multi-wavelength light source and an optical demultiplexer configured to split, for each wavelength, the optical signal output by the multi-wavelength light source or includes a plurality of light sources configured to output optical signals of the wavelengths different from each other.

3. The wireless communication system according to claim 1, wherein
the phase rotation that the optical signal of each wavelength is to undergo while being transmitted through the optical transmission path is obtained from a difference between an amount of phase rotation that an optical signal of any of the plurality of wavelengths is to undergo while being transmitted through the optical transmission path and an amount of the phase rotation that an optical signal of each of the plurality of wavelengths different from each other is to undergo while being transmitted through the optical transmission path.

4. A master station device connected to a slave station device configured to emit, from a plurality of antenna elements, transmission signals received using light via an optical transmission path, the master station device comprising:
- an optical signal output unit configured to output optical signals of a plurality of different wavelengths;
- a phase adjustment unit configured to adjust, for each wavelength, a phase of a corresponding one of the transmission signals based on phase rotation that the optical signal of the wavelength is to undergo while being transmitted through the optical transmission path and a phase in one of the antenna elements corresponding to the wavelength;
- an optical modulation unit configured to modulate, for each wavelength, the optical signal of the wavelength output by the optical signal output unit with the transmission signal the phase of which is adjusted by the phase adjustment unit in accordance with the wavelength, thereby generating an optical modulated signal; and
- an optical combining unit configured to multiplex the optical modulated signal of each wavelength generated by the optical modulation unit and output the multiplexed signal to the optical transmission path.

5. A wireless communication method executed by a wireless communication system including a master station device; and a slave station device configured to emit, from a plurality of antenna elements, transmission signals received using light from the master station device via an optical transmission path, the wireless communication method comprising:
- by the master station device, outputting optical signals of a plurality of different wavelengths;
- by the master station device, adjusting, for each wavelength, a phase of a corresponding one of the transmission signals based on phase rotation that the optical signal of the wavelength is to undergo while being transmitted through the optical transmission path and a phase in one of the plurality of antenna elements corresponding to the wavelength;
- by the master station device, modulating, for each wavelength, the optical signal of the wavelength output in the outputting with the transmission signal the phase of which is adjusted in the adjusting in accordance with the wavelength, thereby generating an optical modulated signal;
- by the master station device, multiplexing the optical modulated signal of each wavelength generated in the modulating and outputting the multiplexed signal to the optical transmission path;
- by the slave station, demultiplexing, for each wavelength, the optical modulated signal transmitted through the optical transmission path; and
- by the slave station, outputting the transmission signal obtained by converting the optical modulated signal of each wavelength demultiplexed in the demultiplexing into an electric signal to one of the plurality of antenna elements corresponding to the wavelength.

\* \* \* \* \*